United States Patent
Ronner

(10) Patent No.: US 8,764,932 B2
(45) Date of Patent: Jul. 1, 2014

(54) MOUNTING MEANS

(75) Inventor: Christian Ronner, Glarus (CH)

(73) Assignee: Glabete AG, Glarus (CH)

( * ) Notice: Subject to any disclaimer, the term of this patent is extended or adjusted under 35 U.S.C. 154(b) by 112 days.

(21) Appl. No.: 13/255,402

(22) PCT Filed: Jan. 22, 2010

(86) PCT No.: PCT/EP2010/000359
§ 371 (c)(1),
(2), (4) Date: Sep. 9, 2011

(87) PCT Pub. No.: WO2010/102691
PCT Pub. Date: Sep. 16, 2010

(65) Prior Publication Data
US 2011/0313098 A1 Dec. 22, 2011

(30) Foreign Application Priority Data
Mar. 10, 2009 (DE) .................. 20 2009 003 176 U

(51) Int. Cl.
*C04B 37/00* (2006.01)
*B01F 15/00* (2006.01)
*C08L 83/00* (2006.01)
*C08L 83/04* (2006.01)

(52) U.S. Cl.
USPC ........................... 156/325; 366/129; 524/588

(58) Field of Classification Search
USPC ........................... 156/325; 366/129; 524/588
See application file for complete search history.

(56) References Cited

U.S. PATENT DOCUMENTS

2006/0093828 A1\* 5/2006 Mahdi et al. .................. 428/412
2007/0157953 A1\* 7/2007 Mahdi et al. .................... 134/42

FOREIGN PATENT DOCUMENTS

JP 57014674 A 1/1982
WO WO-03/03616 A1 1/2003

OTHER PUBLICATIONS

Database WPI Week 198209, Thomson Scientific, London, GB, 1982-16930E.
Goto et al., 1989 Moisture curing adhesive compsn.—contg. inorganic cpds. which release moisture at certain temp. vol. 1989, No. 16, the whole document XP002535598.
International Search Report issued in PCT/EP2010/000359 dated Jul. 27, 2010.
Yano, 2006 Moisture-content curing type adhesive agent for laminate, is obtained by mixing water absorption agent containing water and discharging water by heating, and adhesion base material capable of reacting with water. vol. 2006, No. 25, the whole document XP002535599.

\* cited by examiner

*Primary Examiner* — Michael Orlando
(74) *Attorney, Agent, or Firm* — Venable LLP; Robert Kinberg

(57) ABSTRACT

A mounting system for fixation of two objects includes a single-component aerobic adhesive and a metered amount of moisture added to the adhesive prior to using the adhesive to fixate the objects. The adhesive with the moisture is hardenable while the objects are glued together.

8 Claims, 2 Drawing Sheets

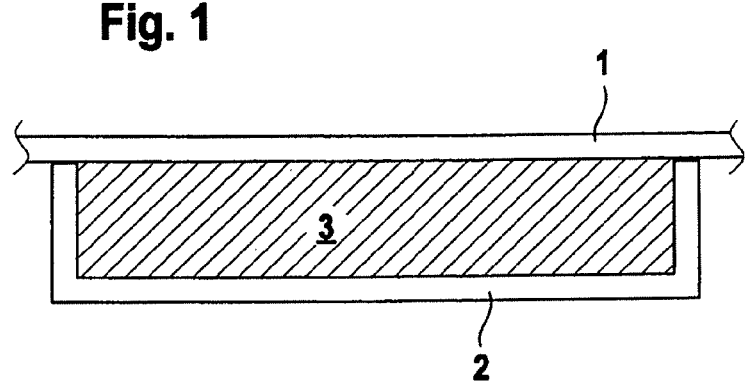
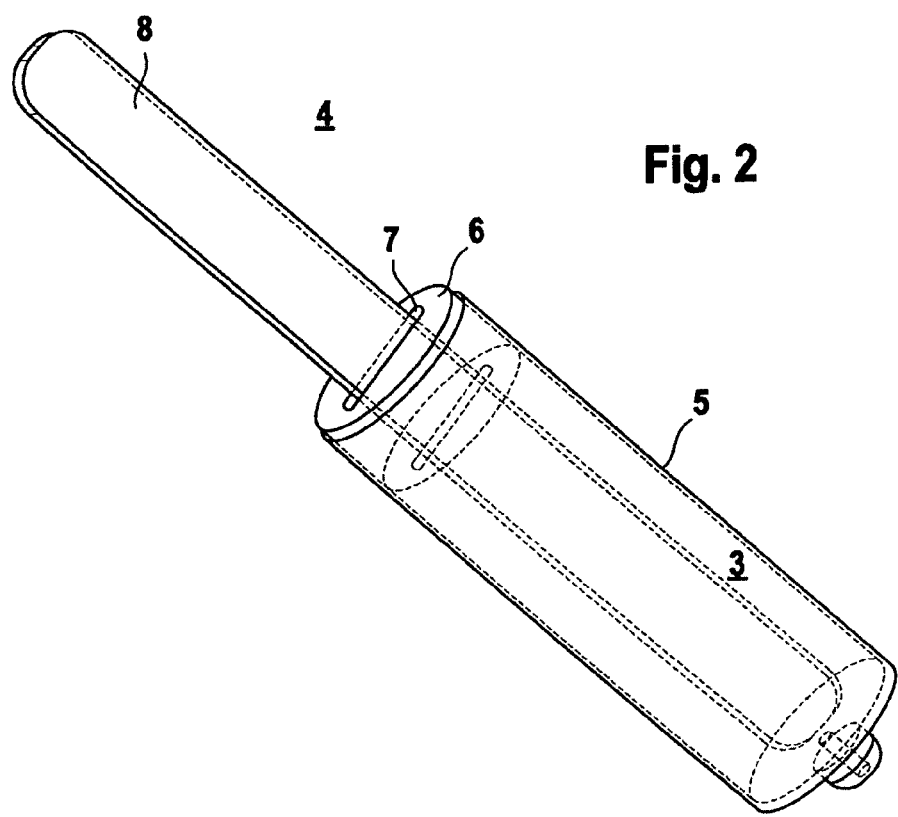

MOUNTING MEANS

BACKGROUND OF THE INVENTION

The invention relates to a mounting system.

The mounting system as disclosed for the present invention comprise single-component adhesives which are generally used for attaching two objects to each other, wherein these adhesives are inserted between the boundary surfaces of two objects.

Single-component adhesives of this type are, in particular, polymer-based adhesives. A general problem with adhesives of this type is that they do not harden at all or only incompletely if they are inserted between two impermeable, diffusion-tight boundary surfaces and thus no longer have sufficient contact with the ambient air.

Until now, satisfactory adhesion results for single-component adhesives of this type could be achieved only if at least one of the boundary surfaces of the objects to which the adhesive is applied was permeable or open to diffusion, so that a contact between the adhesive and the ambient air was possible.

The document WO 03/03616 A1 discloses the use of such aerobic adhesives for forming a mounting system or an assembly system.

This mounting system is used to attach locally fixed objects such as towel holders, shelves, light fixtures or similar equipment articles to the wall, the ceiling or a similar surface, especially in rooms provided with tiles, marble slabs or similar wall coverings. The mounting system consists of different types of mounting elements, as well as an adhesive or joining means in the form of an aerobic adhesive.

The mounting element, which is designed to accommodate a different element holding the object, consists of a basic body provided with a recess on the back side facing the wall and a filling opening that empties into the latter by means of which the aerobic adhesive is inserted between the mounting element and the wall.

The mounting element contains at least one liquid-permeable and gas-permeable opening to permit the escape of air which is displaced when the adhesive is inserted into the recess. This opening extends from the recess to a different surface of the mounting element and accommodates the excess adhesive.

The back side of the basic body that is facing the wall is liquid-permeable and gas-permeable, at least in some regions, so that the gas which develops during the hardening of the adhesive inside the recess can escape, respectively so that volatile bonding agents can vaporize and ambient air can simultaneously reach the adhesive. The adhesive can thus harden and ensure a stable attachment, capable of carrying a load, of the mounting means on the wall.

However, this arrangement has the disadvantage of requiring an additional and by no means cheap structural expenditure to form the basic body and, in particular, also prevents a free design of the mounting means.

SUMMARY OF THE INVENTION

It is therefore a goal of the invention to provide a stable and flexibly usable mounting system for two objects, without requiring structural changes to the objects themselves.

This goal and others is achieved according to an embodiment of the invention by the provision of a mounting system for fixation of two objects, comprising: a single-component aerobic adhesive and a metered amount of moisture added to the adhesive prior to using the adhesive to fix the objects, such that the adhesive with the moisture is hardenable while the objects are glued together.

For this case, the term mounting system generally also comprises the function of the adhesive as a sealing mechanism.

As a result of the metered addition of liquid and especially water to the adhesive, a reproducible and solid connection between two objects is obtained in a surprisingly simple manner since the adhesive can harden completely because of the added liquid. In place of the water, a hydrophilic liquid can furthermore be added, especially in the form of an emulsion.

Depending on whether the liquid is added to the adhesive on the whole or only to partial regions thereof, the hardening resulting from the admixture of liquid occurs over the total volume or partial regions thereof, especially in surface regions.

A proper metering in of moisture, meaning liquid and in particular water, occurs before the adhesive is used to connect the basic surfaces of two objects. Adding too much liquid could destroy the adhesion effect of the adhesive while adding too little moisture could result in an insufficient hardening of the adhesive.

An advantage of the invention is that by adding moisture, the adhesive between the boundary surfaces of the objects can harden reproducibly, independent of environmental influences and independent of the shape of the objects, and can thus create a secure bond between the objects.

The mounting system according to the invention also permits joining objects with diffusion-impermeable boundary surfaces since the adhesive can harden from the inside out as a result of the added moisture. No moisture consequently needs to be supplied via the environment.

The mounting system according to the invention also has advantages when joining two objects of which at least one object has a diffusion-open or permeable boundary surface.

In that case, moisture from the ambient air can travel through the permeable boundary surface to the adhesive and can thus cause a hardening. Depending on the environmental conditions, especially the temperature and moisture content of the air, however, the moisture drawn from the environment may not be sufficient for hardening the adhesive. However, the moisture supplied directly to the adhesive prior to the gluing operation ensures a reproducible hardening. In addition, the reaction time required for the hardening of the adhesive is shortened by the addition of moisture according to the invention.

Owing to the volume reaction of the adhesive with the moisture, as disclosed for the mounting system according to the invention, the mounting system can be used not only to realize adhesive operations where thin layers of adhesive are applied, as known from the systems according to the prior art, but it can also be used to realize thick adhesive layers. Objects having different geometries and consisting of different materials can thus be attached to each other; simply by inserting the adhesive into hollow spaces, interspaces, undercut areas and the like.

According to a one embodiment of the invention, a liquid-impregnated spatula is provided for supplying the liquid, wherein this spatula preferably consists of wood.

The fact that by soaking up liquid and in particular water, such a wooden spatula can absorb a limited but always reproducible amount of moisture is an advantage of this embodiment. The amount of absorbed moisture represents a good way to meter the moisture into the adhesive. By stirring the adhesive with the spatula, even an untrained person can thus easily and quickly meter a suitable amount of moisture into the adhesive.

A further option for metering in a controlled amount of liquid consists of interspersing the adhesive with capsules containing a liquid, wherein the capsules can be broken up through mechanical contact, so that the liquid contained therein comes in contact with the adhesive.

The capsules are may be broken apart by the devices used for mixing the adhesive.

As a result, untrained personnel can be used in this case as well for metering in the liquid. It is furthermore advantageous that the capsules function as reinforcement or to fortify the adhesive, meaning they increase the stability of the adhesive layer.

Alternatively, the adhesive can also contain storage granules for dispensing moisture, so that the liquid is metered into the adhesive via these storage granules.

Finally, the adhesive can be supplied in general with moisture by using a metering device.

Suitable as single-component aerobic adhesives for forming the mounting system according to the invention are adhesives on a polymer base, such as silane MS polymers. Adhesives based on silane modified polymers or hybrid polymers can alternatively also be used.

BRIEF DESCRIPTION OF THE DRAWINGS

The invention is explained in further detail in the following with the aid of the drawings, which show in:

FIG. 1: The joining of two objects with the aid of the mounting means according to the invention, consisting of an aerobic adhesive with metered-in moisture;

FIG. 2: A device for adding moisture to an adhesive;

DETAILED DESCRIPTION

Figure 3A:
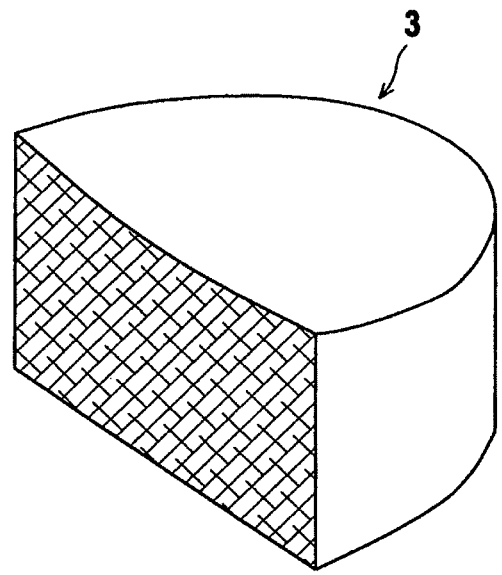
FIG. 3a: An example of a mounting means according to the invention in the form of an adhesive layer that is completely hardened as a result of added moisture.

FIG. 1 schematically shows two objects 1, 2 which are fixedly connected to each other with the aid of a mounting system, including a layer composed of adhesives 3.

In the present case, the objects 1, 2 completely enclose the adhesive layer, wherein the boundary surfaces of the objects 1, 2 are furthermore embodied diffusion-tight or impermeable. For example, the first object 1 can be a tile on the wall of a bathroom or the like. The second object 2 can be a hollow-cylindrical mounting element which is attached with the aid of the mounting system to the tile, so that an appliance, a towel holder or other equipment article can be attached thereto.

The mounting system according to the invention consists of a single-component aerobic adhesive 3 with moisture metered into it, in the present case water, before the adhesive was inserted into the space between the objects 1, 2.

The single-component aerobic adhesive 3, used in the present case, is an adhesive agent composed of silane MS polymers. Alternatively, the adhesive 3 can also be composed of other adhesive agents on a polymer base, for example silane modified polymers or hybrid polymers.

FIG. 2 shows an exemplary embodiment of a device 4 that is used to meter liquid into the single-component aerobic adhesive 3. The device 4 comprises a hollow-cylindrical container 5 with therein stored adhesive 3. The container 5 is closed off securely along the underside by a bottom. The open top of the container 5 is closed with a lid 6 which is positioned rotating inside the opening of the container 5. A slot 7 is provided in the lid 6. FIG. 2 shows that the front end of a wooden spatula 8 can be inserted through the slot 7 into the container 5 while the back end of the spatula projects from the container 5 to the outside.

The spatula 8 is saturated with water. The water stored in the spatula 8 is distributed evenly through the adhesive 3 inside the container 5 when the spatula 8 is turned, lifted up and lowered. Moisture is thus metered into the total volume of the adhesive 3. The adhesive 3 is subsequently inserted into the space between the objects 1, 2.

When pulling the spatula 8 from the container 5, the lid 6 with the slot 7 functions as scraper which allows scraping off any adhesive 3 that is adhering to the spatula 8. Finally, the device 4 according to FIG. 2 can also be used as an injector by means of which the finished adhesive 3 can be applied to the locations of adhesion.

As a result of the moisture contained in the adhesive 3, the adhesive located in the space between the objects 1, 2 can harden completely even though the boundary surfaces of the objects 1, 2 which adjoin the adhesive 3 are diffusion-impermeable and no moisture can therefore be supplied from the outside.

Figure 3B:
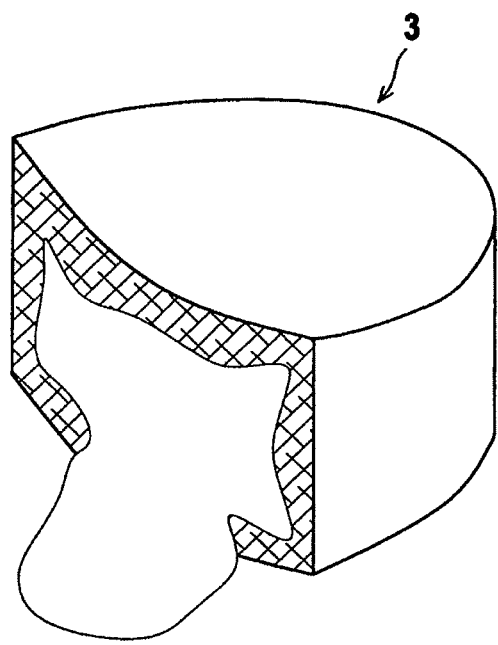
FIG. 3b: An example of an incompletely hardened adhesive layer according to the prior art.

FIG. 3a schematically shows a sectional representation of the adhesive layer between the objects 1,. 2, which is hardened over the total volume. In comparison thereto, FIG. 3b shows an adhesive layer according to the prior art which is not completely hardened and which consists of a single-component aerobic adhesive 3 to which no moisture was supplied before it was inserted between the objects 1, 2. The adhesive 3 will only harden along the edges in that case while a further hardening is prevented by the encapsulation of the adhesive 3 through the objects 1, 2.

Instead of using the device 4, shown in FIG. 2, capsules containing liquid can be dispersed in the adhesive 3. These capsules can be broken apart through mechanical contact, so that the liquid stored therein comes in contact with the adhesive 3.

Alternatively, the adhesive 3 can also contain storage granules for storing the moisture.

The two alternatives have the advantage that the complete volume of the adhesive layer is permeated with moisture.

If the intent is to supply only some regions, in particular boundary surface regions, of an adhesive layer with moisture, then a wet sponge can be used in the simplest case as metering device for supplying moisture only in the boundary surface region of the adhesive layer.

The invention claimed is:

1. A mounting system, comprising: a single-component aerobic adhesive; one of (1) a liquid-saturated wood spatula or (2) liquid-containing capsules mechanically breakable by devices used to mix the adhesive distributed throughout the adhesive, to supply a metered amount of moisture added to the adhesive prior to using the adhesive to fixate objects; and a diffusion impermeable object including a hollow diffusion area shaped to receive the adhesive containing the metered amount of moisture and to form, in use with another diffusion impermeable object, a diffusion impermeable boundary surface completely enclosing the adhesive so that the adhesive is hardenable solely due to the metered amount of moisture, without moisture being supplied from the environment.

2. The mounting system according to claim 1, wherein the total volume of the adhesive is laced with moisture.

3. The mounting system according to claim 1, wherein the adhesive has at least one of volume regions and surface regions laced with moisture.

4. The mounting system according to claim 1, wherein the capsules comprise a reinforcing or fortifying mechanism for the adhesive.

5. The mounting system according to claim 1, wherein the single-component aerobic adhesive comprises a polymer-based adhesive agent.

6. The mounting system according to claim 5, wherein the single-component aerobic adhesive comprises one of an adhesive agent based on silane MS polymers, an adhesive agent based on silane-modified polymers, or an adhesive agent based on hybrid polymers.

7. The mounting system according to claim 1, wherein the moisture supplied to the single-component aerobic adhesive comprises water.

8. The mounting system according to claim 1, wherein the moisture supplied to the single-component aerobic adhesive comprises a hydrophilic liquid.

* * * * *